United States Patent
Yamada et al.

(10) Patent No.: US 11,970,121 B2
(45) Date of Patent: Apr. 30, 2024

(54) IN-VEHICLE POWER SUPPLY SYSTEM

(71) Applicant: Mazda Motor Corporation, Hiroshima (JP)

(72) Inventors: Sadahisa Yamada, Hiroshima (JP); Kazuichi Fujisaka, Hiroshima (JP); Masaaki Shimizu, Hiroshima (JP)

(73) Assignee: MAZDA MOTOR CORPORATION, Hiroshima (JP)

(*) Notice: Subject to any disclaimer, the term of this patent is extended or adjusted under 35 U.S.C. 154(b) by 147 days.

(21) Appl. No.: 17/630,937

(22) PCT Filed: Jul. 22, 2020

(86) PCT No.: PCT/JP2020/028368
§ 371 (c)(1),
(2) Date: Jan. 28, 2022

(87) PCT Pub. No.: WO2021/020257
PCT Pub. Date: Feb. 4, 2021

(65) Prior Publication Data
US 2022/0203909 A1    Jun. 30, 2022

(30) Foreign Application Priority Data

Jul. 30, 2019  (JP) .................................. 2019-139373

(51) Int. Cl.
*B60R 16/023*    (2006.01)
*H02H 9/00*    (2006.01)
*H02H 9/02*    (2006.01)

(52) U.S. Cl.
CPC ......... *B60R 16/0238* (2013.01); *H02H 9/001* (2013.01); *H02H 9/02* (2013.01)

(58) Field of Classification Search
CPC .... B60R 16/0238; B60R 16/03; H02H 9/001; H02H 9/02; G05B 23/0213
See application file for complete search history.

(56) References Cited

U.S. PATENT DOCUMENTS 6,163,690 A    12/2000  Lilja
11,590,933 B2 *  2/2023  Thompson ............. B60R 25/01
(Continued)

FOREIGN PATENT DOCUMENTS

CN    107415867 A    12/2017
CN    110667496 A *  1/2020 ............. B60R 16/03
(Continued)

OTHER PUBLICATIONS

International Search Report and Written Opinion dated Sep. 24, 2020, received for PCT Application PCT/JP2020/028368, Filed on Jul. 22, 2020, 8 pages including English Translation.

*Primary Examiner* — Daniel Cavallari
(74) *Attorney, Agent, or Firm* — XSENSUS LLP

(57) ABSTRACT

An in-vehicle power supply system includes first to sixth power supply hubs connected to a main feed line, electronic devices connected to the first to sixth power supply hubs via a sub feed line, and a control device configured to control power feeding to the electronic devices. The control device is configured to control, based on a condition regarding a current consumption of the electronic devices, power feeding to the electronic devices such that the current consumption of the electronic devices is lower than an allowable current consumption that is predetermined in accordance with a scene of using a vehicle.

10 Claims, 3 Drawing Sheets

(56) References Cited

U.S. PATENT DOCUMENTS

| | | |
|---|---|---|
| 2002/0113492 A1 | 8/2002 | Sakamoto et al. |
| 2009/0164071 A1 | 6/2009 | Takeda |
| 2016/0059807 A1* | 3/2016 | Iwasaki .................. B60R 16/03 |
| | | 307/10.1 |
| 2019/0168693 A1 | 6/2019 | Nakamura et al. |

FOREIGN PATENT DOCUMENTS

| | | |
|---|---|---|
| JP | 2002-539652 A | 11/2002 |
| JP | 2009-149243 A | 7/2009 |
| JP | 2016-201740 A | 12/2016 |
| JP | 2019-102305 A | 6/2019 |

\* cited by examiner

IN-VEHICLE POWER SUPPLY SYSTEM

CROSS-REFERENCE TO RELATED APPLICATIONS

The present application is based on PCT/JP2020/028368 filed on Jul. 22, 2020, and claims priority to Japanese Application No. 2019-139373 filed on Jul. 30, 2019, the entire contents of each are incorporated herein by reference.

TECHNICAL FIELD

The present disclosure relates to an in-vehicle power supply system.

BACKGROUND ART

An existing in-vehicle power supply system has a configuration in which many electronic devices are disposed in a vehicle and power is fed to the individual electronic devices via feed lines (see, for example, Japanese Unexamined Patent Application Publication No. 2016-201740 (PTL 1)).

CITATION LIST

Patent Literature

PTL 1: Japanese Unexamined Patent Application Publication No. 2016-201740

SUMMARY

Technical Problem

In the above-described in-vehicle power supply system, the configuration of feed lines from a power supply is not particularly taken into consideration. Thus, when the number of electronic devices increases, it is impossible to minimize power feeding to the individual electronic devices and reduce power consumption in accordance with a scene of using the vehicle.

The present disclosure provides an in-vehicle power supply system that minimizes power feeding to individual electronic devices in accordance with a scene of using the vehicle.

Solution to Problem

An in-vehicle power supply system of the present disclosure includes:
  a plurality of power supply hubs connected to a main feed line;
  a plurality of electronic devices connected to the plurality of power supply hubs via a sub feed line; and
  a control device configured to control power feeding to the plurality of electronic devices, in which
  each of the plurality of power supply hubs is connected to another of the plurality of power supply hubs by the main feed line which is continuous, and
  the control device is configured to control, based on a condition regarding a current consumption of the plurality of electronic devices, power feeding to the plurality of electronic devices such that the current consumption of the plurality of electronic devices is lower than an allowable current consumption that is predetermined in accordance with a scene of using a vehicle.

According to the above-described configuration, the control device controls, based on a condition regarding a current consumption of the plurality of electronic devices, power feeding to the plurality of electronic devices such that the current consumption of the plurality of electronic devices is lower than an allowable current consumption that is predetermined in accordance with a scene of using the vehicle, and thereby power feeding to the individual electronic devices can be minimized in accordance with a scene of using the vehicle.

In an in-vehicle power supply system according to an aspect of the present disclosure,
  the condition regarding the current consumption of the plurality of electronic devices includes an energization time during which functions of the plurality of electronic devices are exhibited, a current consumption of the plurality of electronic devices, and a standby current of the plurality of electronic devices.

According to the above-described configuration, as a result of determining the allowable current consumption in accordance with a scene of using the vehicle based on an energization time during which functions of the individual electronic devices are exhibited, a power consumption, and a standby current, early running out of a battery can be effectively suppressed.

In an in-vehicle power supply system according to an aspect of the present disclosure,
  the scene of using the vehicle includes a scene of updating a program of the control device.

According to the above-described configuration, in the scene of updating the program of the control device, power feeding to the individual electronic devices can be minimized by preferentially feeding power to an electronic device requiring the power.

In an in-vehicle power supply system according to an aspect of the present disclosure,
  the scene of using the vehicle includes a scene from factory shipment to end of transportation.

According to the above-described configuration, in the scene from factory shipment to end of transportation, power feeding to the individual electronic devices can be minimized by preferentially feeding power to an electronic device requiring the power.

In an in-vehicle power supply system according to an aspect of the present disclosure,
  the scene of using the vehicle includes a scene of being parked in which a user does not use the vehicle.

According to the above-described configuration, in the scene of being parked in which a user does not use the vehicle, power feeding to the individual electronic devices can be minimized by preferentially feeding power to an electronic device requiring the power.

Advantageous Effects

As is clear from the above, according to the present disclosure, it is possible to implement an in-vehicle power supply system that minimizes power feeding to individual electronic devices in accordance with a scene of using the vehicle.

DESCRIPTION OF EMBODIMENTS

Figure 1:
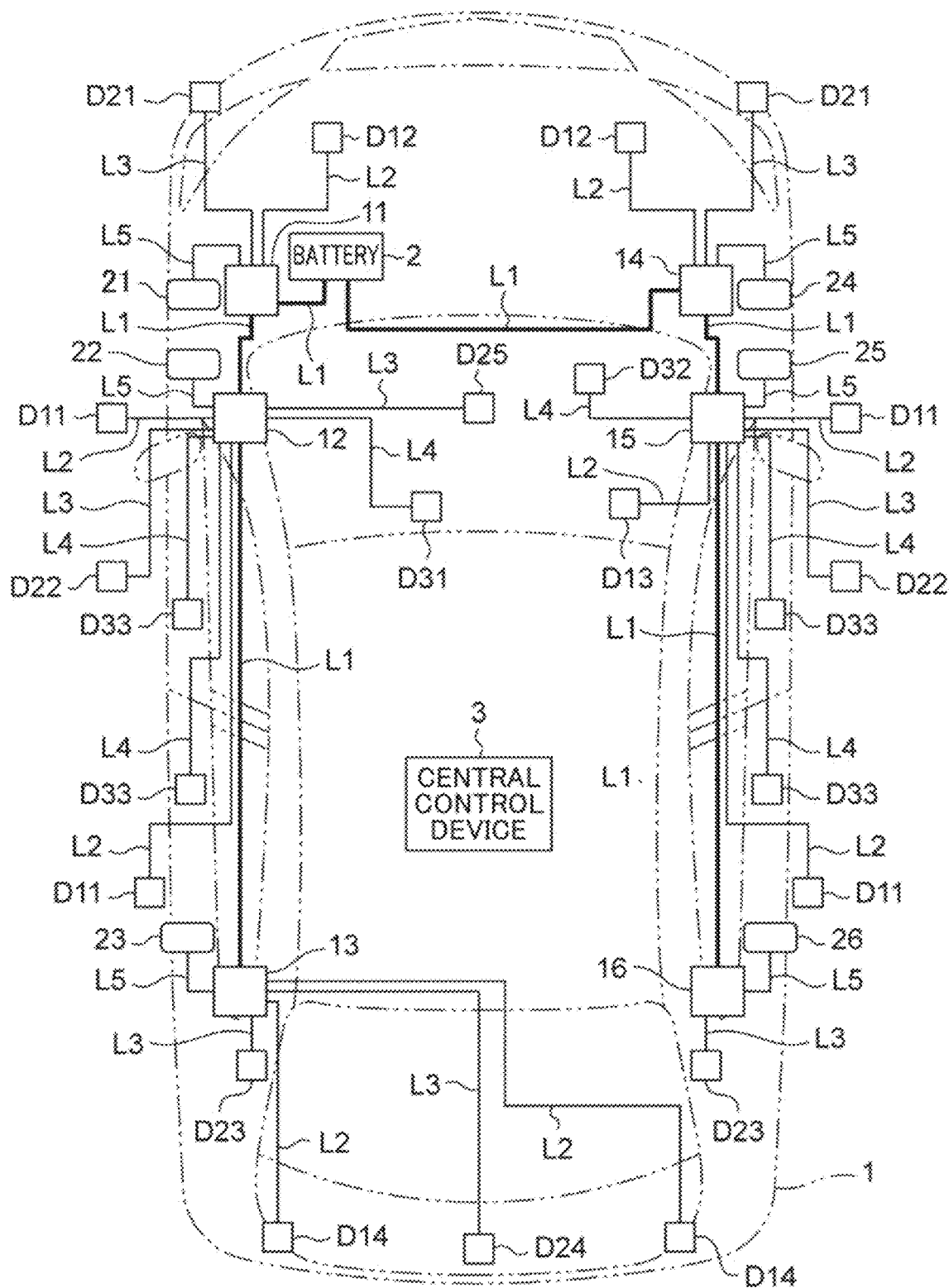
FIG. 1 is a power supply system diagram of a vehicle related to an in-vehicle power supply system of an embodiment of the present disclosure.

Hereinafter, an in-vehicle power supply system of the present disclosure will be described in detail with reference to an embodiment illustrated in the drawings. In the drawings, the same reference numerals represent the same or corresponding parts. In the following description, "front", "rear", "right", and "left" mean "front of a vehicle 1", "rear of the vehicle 1", "right of the vehicle 1", and "left of the vehicle 1", respectively. For example, a "front-rear direction" means a "front-rear direction of the vehicle 1".

FIG. 1 is a power supply system diagram of the vehicle 1 in which an in-vehicle power supply system of an embodiment of the present disclosure is mounted. The vehicle 1 is a five-door engine car including four side doors and one back door.

As illustrated in FIG. 1, the vehicle 1 includes first to sixth power supply hubs 11 to 16 electrically connected to a battery 2 via main feed lines L1, a plurality of electronic devices D11 to D14, D21 to D25, and D31 to D33 electrically connected to the first to sixth power supply hubs 11 to 16 via sub feed lines L2 to L5, first to sixth electronic control units (ECUs) 21 to 26 that control ON and OFF of energization of the plurality of electronic devices D11 to D14, D21 to D25, and D31 to D33, and a central control device 3 that controls the first to sixth ECUs 21 to 26. The first to sixth ECUs 21 to 26 are electrically connected to the first to sixth power supply hubs 11 to 16 via the sub feed lines L5 and communication lines L12 (illustrated in FIG. 3).

The first to sixth ECUs 21 to 26 and the central control device 3 correspond to an example of a control device. The first to sixth ECUs 21 to 26 correspond to an example of a sub control device, whereas the central control device 3 corresponds to an example of a main control device.

More specifically, the vehicle 1 includes the plurality of electronic devices D11 to D14, D21 to D25, and D31 to D33 that are operated by power fed from the battery 2. The electronic devices D11 to D14 are electronic devices (first electronic devices) to which power can be constantly fed from the battery 2, and are also referred to as constantly-power-fed electronic devices. On the other hand, the electronic devices D21 to D25 and D31 to D33 are electronic devices (second electronic devices) to which power can be fed from the battery 2 by an operation performed by a passenger of the vehicle 1. The electronic devices D21 to D25 consume less power than the electronic devices D31 to D33, and are also referred to as accessory electronic devices. The electronic devices D31 to D33 consume more power than the electronic devices D21 to D25, and are also referred to as ignition electronic devices.

The electronic devices D11 to D14, which are also referred to as constantly-power-fed electronic devices, are the following, for example: the electronic devices D11 are keyless devices; the electronic devices D12 are monitoring camera devices for theft monitoring; the electronic device D13 is a burglar alarm device; and the electronic devices D14 are brake lights. The keyless devices receive radio waves from a transmitter in a key carried by a passenger.

The electronic devices D21 to D25, which are also referred to as accessory electronic devices, are electronic devices that are assumed to be used regardless of whether the engine of the vehicle 1 is ON or OFF. For example, the electronic devices D21 are headlights, the electronic devices D22 are electric mirrors, the electronic devices D23 are audio devices, the electronic device D24 is a rear camera device, and the electronic device D25 is a car navigation device. A display of the car navigation device displays an image captured by the rear camera device in accordance with movement of a shift lever to a reverse position. The rear camera device is an example of a camera device.

The electronic devices D31 to D33, which are also referred to as ignition electronic devices, can be used even when the engine of the vehicle 1 is OFF, but are electronic devices basically assumed to be used when the engine is ON. For example, the electronic device D31 is an air conditioner, the electronic device D32 is an electric power steering device, and the electronic devices D33 are electric power windows.

The electronic devices D11 to D14, D21 to D25, and D31 to D33 may include a sensor, an actuator, an ECU for controlling the actuator, and the like for operating the devices described above.

In the power supply system of the vehicle 1, the vehicle 1 is divided into six zones, and each zone has any one of the first to sixth power supply hubs 11 to 16. The first power supply hub 11 is disposed in a left front zone. The second power supply hub 12 is disposed near a left-front side door zone. The third power supply hub 13 is disposed in a left rear zone. The fourth power supply hub 14 is disposed in a right front zone. The fifth power supply hub 15 is disposed near a right-front side door zone. The sixth power supply hub 16 is disposed in a right rear zone. In the case of increasing or decreasing the number of zones, the number of the first to sixth power supply hubs 11 to 16 increases or decreases in accordance with the increase or decrease in the number of zones.

The battery 2, the main feed line L1, the first to third power supply hubs 11 to 13, and the sub feed lines L2 to L4 form a power supply path. The battery 2, the main feed line L1, the fourth to sixth power supply hubs 14 to 16, and the sub feed lines L2 to L4 form a power supply path. Although not illustrated, a fuse based on a current carrying capacity is disposed in the power supply paths as necessary.

The first to sixth power supply hubs 11 to 16 are disposed in the power supply paths between the battery 2 and the electronic devices D11 to D14, D21 to D25, and D31 to D33. To be more specific, the first power supply hub 11 is disposed in the power supply path between the battery 2 and the electronic devices D12 and D21 in the left front zone. The second power supply hub 12 is disposed in the power supply path between the battery 2 and the electronic devices D11, D22, and D33 in or near the left side door zone and between the battery 2 and the electronic device D25 on the center side. The third power supply hub 13 is disposed in the power supply path between the battery 2 and the electronic devices D14 and D23 in the left rear zone, between the battery 2 and the electronic device D14 on the right rear side, and between the battery 2 and the electronic device D24 on the rear side. The fourth power supply hub 14 is disposed in the power supply path between the battery 2 and the electronic devices D12 and D21 in the right front zone. The fifth power supply hub 15 is disposed in the power supply path between the battery 2 and the electronic devices D11, D22, and D33 in or near the right-front side door zone. The sixth power supply hub 16 is disposed in the power supply path between the battery 2 and the electronic device D23 in the right rear zone.

The first to sixth power supply hubs 11 to 16 are each connected to the battery 2 or another of the first to sixth power supply hubs 11 to 16 in the vicinity thereof by a continuous main feed line L1. To be more specific, the first power supply hub 11 and the fourth power supply hub 14 are each connected to the battery 2 by the main feed line L1. The second power supply hub 12 is connected to the first power supply hub 11 by the main feed line L1. The third power supply hub 13 is connected to the second power supply hub 12 by the main feed line L1. The fifth power supply hub 15 is connected to the fourth power supply hub 14 by the main feed line L1. The sixth power supply hub 16 is connected to the fifth power supply hub 15 by the main feed line L1.

The first to sixth power supply hubs 11 to 16 are fed with power via the main feed lines L1. To be more specific, the first and fourth power supply hubs 11 and 14 are each fed with power from the battery 2 via the main feed line L1. The second power supply hub 12 is fed with power from the battery 2 via the main feed line L1 and the first power supply hub 11. The third power supply hub 13 is fed with power from the battery 2 via the main feed line L1 and the first and second power supply hubs 11 and 12. The fourth power supply hub 14 is fed with power from the battery 2 via the main feed line L1. The fifth power supply hub 15 is fed with power from the battery 2 via the main feed line L1 and the fourth power supply hub 14. The sixth power supply hub 16 is fed with power from the battery 2 via the main feed line L1 and the fourth and fifth power supply hubs 14 and 15.

The first to sixth power supply hubs 11 to 16 are connected to the electronic devices D11 to D14, D21 to D25, and D31 to D33 via the sub feed lines L2 to L4. To be more specific, the first and fourth power supply hubs 11 and 14 are each connected to the electronic devices D12 and D21 via the sub feed lines L2 and L3. The second power supply hub 12 is connected to the electronic devices D11, D22, D25, D31, and D33 via the sub feed lines L2 to L4. The third power supply hub 13 is connected to the electronic devices D14, D23, and D24 via the sub feed lines L2 and L3. The fifth power supply hub 15 is connected to the electronic devices D11, D13, D22, D25, D32, and D33 via the sub feed lines L2 to L4. The sixth power supply hub 16 is connected to the electronic device D23 via the sub feed line L3.

Each of the main feed lines L1 and each of the sub feed lines L2 to L4 may be an electric line capable of feeding power, and is formed of, for example, a wire harness.

The first power supply hub 11 is connected to the first ECU 21 via the sub feed line L5. The second power supply hub 12 is connected to the second ECU 22 via the sub feed line L5. The third power supply hub 13 is connected to the third ECU 23 via the sub feed line L5. The fourth power supply hub 14 is connected to the fourth ECU 24 via the sub feed line L5. The fifth power supply hub 15 is connected to the fifth ECU 25 via the sub feed line L5. The sixth power supply hub 16 is connected to the sixth ECU 26 via the sub feed line L5.

The first to sixth ECUs 21 to 26 have a function of managing and controlling the respective electronic devices D11 to D14, D21 to D25, and D31 to D33. For example, the first to sixth ECUs 21 to 26 receive detection results from various sensors (a vehicle speed sensor, a vehicle indoor temperature sensor, and the like) and use the detection results for processing in their own devices and/or transmit information to the central control device 3.

Figure 3:
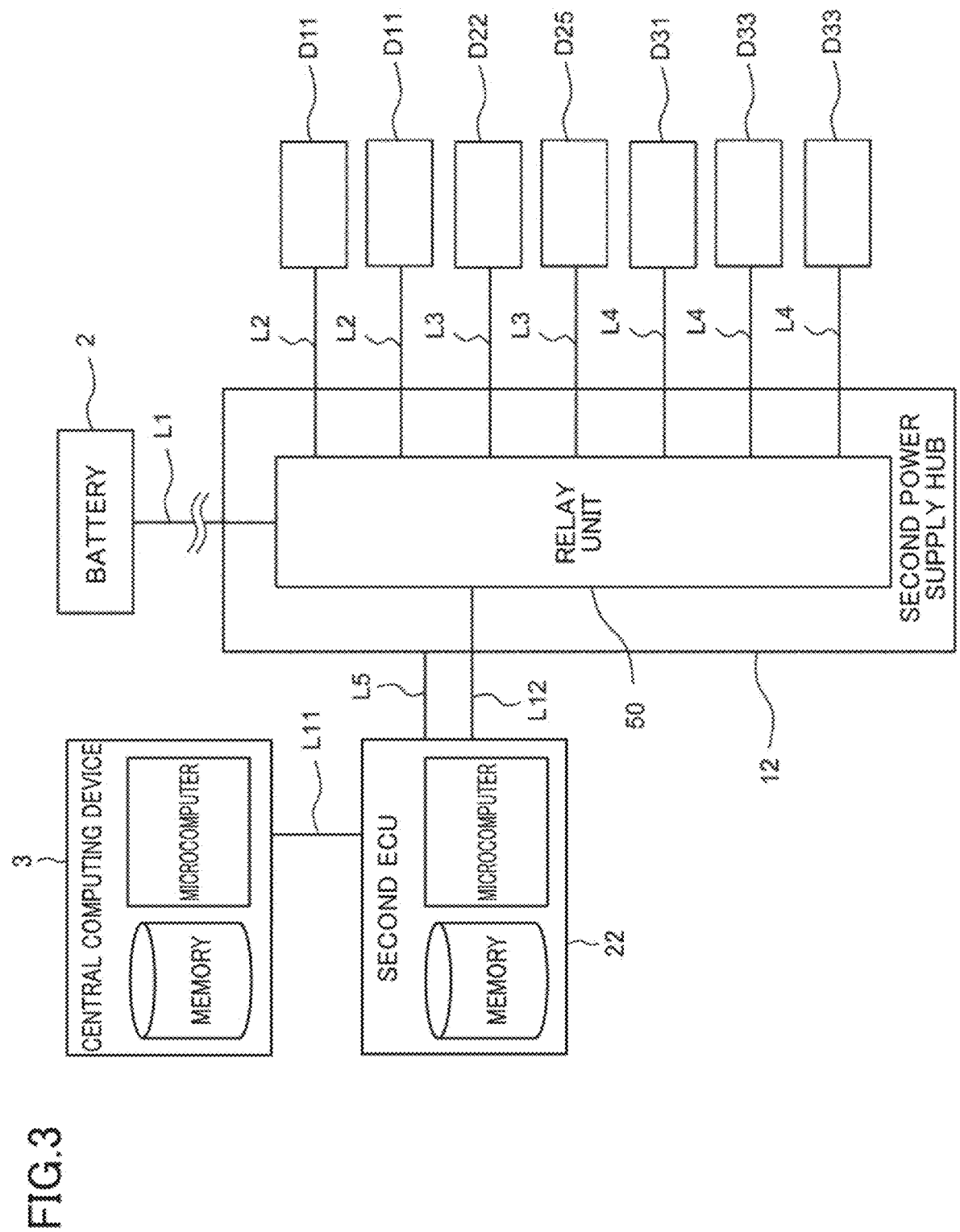
FIG. 3 is a diagram illustrating a power supply topology of a zone in which a second power supply hub is disposed.

The first to sixth ECUs 21 to 26 each include a microcomputer and a memory. In FIG. 3 described below, the second ECU 22 is illustrated. The memory stores modules serving as software executable by the microcomputer. The functions of the first to sixth ECUs 21 to 26 are implemented by, for example, the microcomputer executing the individual modules stored in the memory. The microcomputer and the memory may be a plurality of microcomputers and a plurality of memories. Some of the functions of the first to sixth ECUs 21 to 26 may be implemented by a hardware circuit.

The central control device 3 is constituted by a microcomputer, an input/output circuit, a memory, and so forth, and controls the electronic devices D11 to D14, D21 to D25, and D31 to D33. The memory stores modules serving as software executable by the microcomputer. The functions of the central control device 3 are implemented by, for example, the microcomputer executing the individual modules stored in the memory. The microcomputer and the memory may be a plurality of microcomputers and a plurality of memories. Some of the functions of the central control device 3 may be implemented by a hardware circuit.

Figure 2:
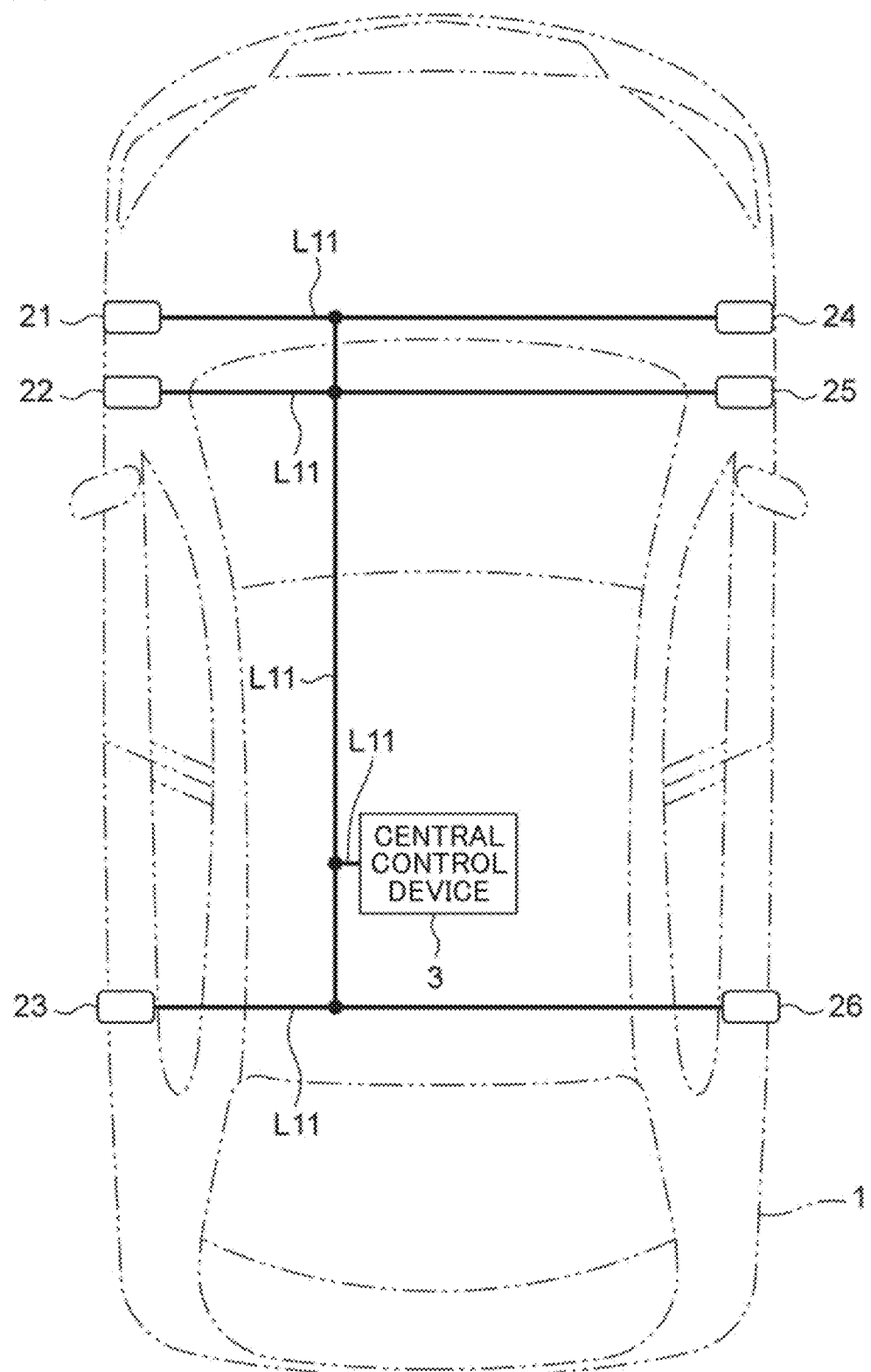
FIG. 2 is a signal system diagram of a main part of the vehicle.

FIG. 2 is a signal system diagram of a main part of the vehicle 1.

As illustrated in FIG. 2, the first to sixth ECUs 21 to 26 are configured to receive control signals from the central control device 3 that controls the entire vehicle 1. To be more specific, the central control device 3 and the first to sixth ECUs 21 to 26 are connected to each other by communication lines L11. Thus, the control signals output from the central control device 3 are input to the first to sixth ECUs 21 to 26 via the communication lines L11. At this time, the first to sixth ECUs 21 to 26 feed power to the electronic devices D11 to D14, D21 to D25, and D31 to D33 or cut off the power, in response to control signals from the central control device 3.

As a communication scheme (communication protocol) between the central control device 3 and the first to sixth ECUs 21 to 26, for example, Controller Area Network (CAN) or CAN with Flexible Data rate (CAN-FD) is used. However, another communication scheme may be used, or a plurality of communication schemes may be used in combination.

FIG. 3 is a diagram illustrating a power supply topology of a zone in which the second power supply hub 12 is disposed (the left-front side door zone of the vehicle 1). In FIG. 3, L12 denotes a communication line connecting the second power supply hub 12 and the second ECU 22.

As illustrated in FIG. 3, the second power supply hub 12 includes a relay unit 50 that turns ON or OFF energization of the electronic devices D11, D22, D25, D31, and D33. For example, the electronic devices D11 are keyless devices, the electronic device D22 is an electric mirror, the electronic device D25 is a car navigation device, the electronic device D31 is an air conditioner, and the electronic devices D33 are electric power windows. The relay unit 50 is electrically connected to the battery 2 via the main feed line L1. The relay unit 50 is electrically connected to the electronic devices D11, D22, D25, D31, and D33 via the sub feed lines L2, L3, and L4. The relay unit 50 includes a plurality of relays (not illustrated) for individually turning ON or OFF energization of the electronic devices D11, D22, D25, D31, and D33. Each of the relays is turned ON or OFF in response to input of a control signal from the central control device 3. The relays of the relay unit 50 are each constituted by a so-called mechanical relay or semiconductor relay. Cutting off of the relays of the relay unit 50 makes it possible to completely shut off energization of the electronic devices D11, D22, D25, D31, and D33, and thus the occurrence of a so-called dark current can be eliminated.

The first and third to sixth power supply hubs 11 and 13 to 16 each have a configuration similar to that of the second power supply hub 12.

The central control device 3 controls, based on a condition regarding a current consumption of the plurality of electronic devices D11 to D14, D21 to D25, and D31 to D33, power feeding to the plurality of electronic devices D11 to D14, D21 to D25, and D31 to D33 such that the current consumption of the plurality of electronic devices D11 to D14, D21 to D25, and D31 to D33 is lower than an allowable current consumption (mA order) that is predetermined in accordance with a scene of using the vehicle 1.

The condition regarding the current consumption of the plurality of electronic devices D11 to D14, D21 to D25, and D31 to D33 is stored in advance in the central control device 3. Alternatively, the central control device 3 may refer to a server on an external network via an in-vehicle communication device and acquire a condition corresponding to the situation of the vehicle. In the latter case, the current consumption can be minimized even when an unexpected vehicle situation occurs, for example, when a disaster occurs and refueling or charging cannot be received for a while.

In the in-vehicle power supply system of this embodiment, the allowable current consumption is determined in accordance with a scene of using the vehicle 1, based on an energization time during which functions of the plurality of electronic devices D11 to D14, D21 to D25, and D31 to D33 are exhibited, a current consumption of the plurality of electronic devices D11 to D14, D21 to D25, and D31 to D33, and a standby current of the plurality of electronic devices D11 to D14, D21 to D25, and D31 to D33.

In the in-vehicle power supply system having the above-described configuration, the central control device 3 controls, based on a condition regarding a current consumption of the plurality of electronic devices D11 to D14, D21 to D25, and D31 to D33, the first to sixth ECUs 21 to 26 to turn ON or OFF power feeding to the plurality of electronic devices D11 to D14, D21 to D25, and D31 to D33 such that the current consumption of the plurality of electronic devices D11 to D14, D21 to D25, and D31 to D33 is lower than an allowable current consumption that is predetermined in accordance with a scene of using the vehicle 1, and thereby power feeding to the electronic devices D11 to D14, D21 to D25, and D31 to D33 is minimized in accordance with a scene of using the vehicle 1. Accordingly, it is possible to suppress early running out of the battery 2.

In this case, even for the electronic devices D21 to D25 serving as accessory electronic devices, power feeding may be turned OFF depending on a scene of using the vehicle 1.

In addition, the allowable current consumption is determined in accordance with a scene of using the vehicle 1 based on an energization time during which functions of the individual electronic devices D11 to D14, D21 to D25, and D31 to D33 are exhibited, a power consumption, and a standby current. Accordingly, early running out of the battery 2 can be effectively suppressed.

Here, examples of a scene of using the vehicle 1 include a scene of updating a program of the central control device 3, a scene from factory shipment to end of transportation (including inside a carrier ship or the like), and a scene of being parked in which a user does not use the vehicle 1. Information on a scene of using the vehicle 1 is input to the central control device 3 by wired communication (or wireless communication) with an external terminal and/or operation means such as a switch.

For example, in the scene of updating the program of the central control device 3, power may be preferentially fed to an electronic device requiring the power among the electronic devices D11 to D14, D21 to D25, and D31 to D33. Accordingly, power feeding to the individual electronic devices D11 to D14, D21 to D25, and D31 to D33 can be minimized.

In the scene from factory shipment to end of transportation, power may be preferentially fed to an electronic device requiring the power among the electronic devices D11 to D14, D21 to D25, and D31 to D33. Accordingly, power feeding to the individual electronic devices D11 to D14, D21 to D25, and D31 to D33 can be minimized.

In the scene of being parked in which the user does not use the vehicle 1, power may be preferentially fed to an electronic device requiring the power among the electronic devices D11 to D14, D21 to D25, and D31 to D33. Accordingly, power feeding to the individual electronic devices D11 to D14, D21 to D25, and D31 to D33 can be minimized.

A vehicle equipped with the above-described in-vehicle power supply system estimates a passenger's intention to use a certain electronic device, based on a behavior of the passenger and a situation of the vehicle, and optimizes starting of energization of the electronic device so that information can be provided to the passenger from the electronic device at a desired timing and so that wasteful current consumption due to early energization can be prevented.

For example, in startup of a back camera, energization of the back camera is started when the vehicle is traveling at a low speed in a parking lot or near a parking space, when a foot brake is pressed (vehicle situation), or when an indoor camera recognizes that a passenger extends his/her hand to a shift lever (passenger situation).

In the above-described in-vehicle power supply system, the electronic devices are not kept in a standby state with minimum power fed thereto, but energization is physically cut off by the relays of the relay unit 50, and energization is started a predetermined time before a necessary time point. Thus, the occurrence of a so-called dark current can be completely prevented.

The first to sixth ECUs 21 to 26 control ON and OFF of energization of the electronic devices D11 to D14, D21 to D25, and D31 to D33, and thus a control load of the central control device 3 can be reduced.

The in-vehicle power supply system of the above-described embodiment has a configuration in which the vehicle 1 is divided into six zones and ON and OFF of power feeding to the electronic devices D11 to D14, D21 to D25, and D31 to D33 can be controlled in each zone. The manner of division into zones and the number of zones are not limited thereto.

In the above-described embodiment, the vehicle 1 is an engine car, but may be, for example, a plug-in hybrid car, an electric car, or the like.

In the above-described embodiment, a description has been given of a case in which the electronic devices D are fed with power from the battery 2. When the engine is ON, power is fed from an alternator (not illustrated).

In the above-described embodiment, the third power supply hub 13 and the sixth power supply hub 16 are not directly electrically connected to each other by the main feed line L1, but the main feed line L1 may be provided therebetween. In other words, the third power supply hub 13 may be electrically connected to the sixth power supply hub 16 via the main feed line L1.

In the above-described embodiment, the first to sixth power supply hubs 11 to 16 are provided separately from the first to sixth ECUs 21 to 26, but may be provided integrally with the first to sixth ECUs 21 to 26. In other words, at least one of the first to sixth power supply hubs 11 to 16 may be configured to have a function similar to that of the first to sixth ECUs 21 to 26.

Although a specific embodiment of the present disclosure has been described, the present disclosure is not limited to the above-described embodiment, and various modifications can be carried out within the scope of the present disclosure. For example, contents of the above-described embodiment may be combined as appropriate to make an embodiment of the present disclosure.

The invention claimed is:

1. An in-vehicle power supply system comprising:
a plurality of power supply hubs connected to a main feed line;
a plurality of electronic devices connected to the plurality of power supply hubs via a sub feed line; and
a control circuit configured to control power feeding to the plurality of electronic devices, wherein
each of the plurality of power supply hubs is connected to another of the plurality of power supply hubs by the main feed line which is continuous,
the control circuit is configured to control, based on a condition regarding a current consumption of the plurality of electronic devices, power feeding to the plurality of electronic devices such that the current consumption of the plurality of electronic devices is lower than an allowable current consumption that is predetermined in accordance with a scene of using a vehicle, and
the condition regarding the current consumption of the plurality of electronic devices comprises an energization time during which functions of the plurality of electronic devices are exhibited, a current consumption of the plurality of electronic devices, and a standby current of the plurality of electronic devices.

2. The in-vehicle power supply system according to claim 1, wherein
the scene of using the vehicle includes a scene of updating a program of the control circuit.

3. The in-vehicle power supply system according to claim 2, wherein
the scene of using the vehicle includes a scene from factory shipment to end of transportation.

4. The in-vehicle power supply system according to claim 3, wherein
the scene of using the vehicle includes a scene of being parked in which a user does not use the vehicle.

5. The in-vehicle power supply system according to claim 2, wherein
the scene of using the vehicle includes a scene of being parked in which a user does not use the vehicle.

6. The in-vehicle power supply system according to claim 1, wherein
the scene of using the vehicle includes a scene from factory shipment to end of transportation.

7. The in-vehicle power supply system according to claim 1, wherein
the scene of using the vehicle includes a scene of being parked in which a user does not use the vehicle.

8. An in-vehicle power supply system comprising:
a plurality of power supply hubs connected to a main feed line;
a plurality of electronic devices connected to the plurality of power supply hubs via a sub feed line; and
a control circuit configured to control power feeding to the plurality of electronic devices, wherein
each of the plurality of power supply hubs is connected to another of the plurality of power supply hubs by the main feed line which is continuous,
the control circuit is configured to control, based on a condition regarding a current consumption of the plurality of electronic devices, power feeding to the plurality of electronic devices such that the current consumption of the plurality of electronic devices is lower than an allowable current consumption that is predetermined in accordance with a scene of using a vehicle, and
the scene of using the vehicle includes a scene of updating a program of the control circuit.

9. An in-vehicle power supply system comprising:
a plurality of power supply hubs connected to a main feed line;
a plurality of electronic devices connected to the plurality of power supply hubs via a sub feed line; and
a control circuit configured to control power feeding to the plurality of electronic devices, wherein
each of the plurality of power supply hubs is connected to another of the plurality of power supply hubs by the main feed line which is continuous,
the control circuit is configured to control, based on a condition regarding a current consumption of the plurality of electronic devices, power feeding to the plurality of electronic devices such that the current consumption of the plurality of electronic devices is lower than an allowable current consumption that is predetermined in accordance with a scene of using a vehicle, and
the scene of using the vehicle includes a scene from factory shipment to end of transportation.

10. An in-vehicle power supply system comprising:
a plurality of power supply hubs connected to a main feed line;
a plurality of electronic devices connected to the plurality of power supply hubs via a sub feed line; and
a control circuit configured to control bower feeding to the plurality of electronic devices, wherein
each of the plurality of power supply hubs is connected to another of the plurality of power supply hubs by the main feed line which is continuous,
the control circuit is configured to control, based on a condition regarding a current consumption of the plurality of electronic devices, power feeding to the plurality of electronic devices such that the current consumption of the plurality of electronic devices is lower than an allowable current consumption that is predetermined in accordance with a scene of using a vehicle, and
the scene of using the vehicle includes a scene of being parked in which a user does not use the vehicle.

* * * * *